Oct. 23, 1945. O. LESSER 2,387,593
ADHESIVE UNIT
Filed March 10, 1942

Inventor
OTTO LESSER
By
Attorney.

Patented Oct. 23, 1945

2,387,593

UNITED STATES PATENT OFFICE 2,387,593

ADHESIVE UNIT

Otto Lesser, Berlin, Germany; vested in the Alien Property Custodian

Application March 10, 1942, Serial No. 434,079½
In Germany June 26, 1940

4 Claims. (Cl. 117—68.5)

This invention relates to adhesive units.

This invention has utility when incorporated in adhesive units as individual bandages or in continuous strips to provide such units with adhesive on one or both sides and so distributed that when the units are grouped or a continuing strip rolled, there is no necessity for a cover strip in order to facilitate the separation or unrolling.

Referring to the drawing.

The units whether individual or of continuing strip form comprise a base of flexible material $a$ preferably of some woven material. In the invention herein adhesive $b$ may be so distributed that the units may be stacked or the tape rolled so that ready separation may be had without the use of intermediate separators.

Figure 1:
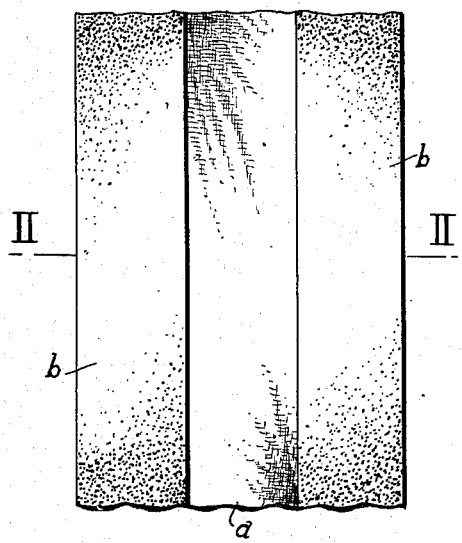
Fig. 1 is a plan view of an adhesive unit showing the adhesive distributed along the edges thereof and having a space therebetween.
Figure 2:
Fig. 2 is a view on the line II—II, Fig. 1.
Figure 4:
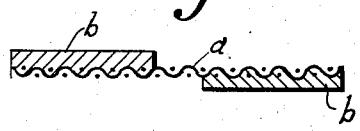
Fig. 4 is a view on the line IV—IV, Fig. 3.

Referring to Figs. 1, 2, the adhesive $b$ is distributed along the opposite edges on one side and spaced along the central portion of the opposite side.

Figure 3:
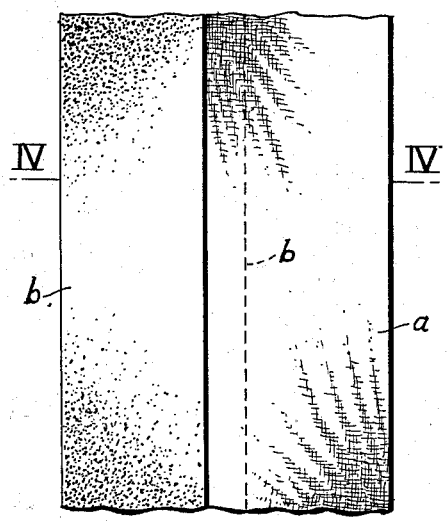
Fig. 3 is a plan view showing a unit having the adhesive along one edge on one side and along the other edge on the opposite side.

Figs. 2, 3 show the distribution of the adhesive $b$ along one edge on one side of the unit but along the opposite side on the other side thereof. The adhesive is so distributed that there is a space therebetween with no overlapping.

What is claimed and and it is desired to secure by Letters Patent is:

1. An adhesive unit comprising a flexible strip of non-adhesive material having adhesive areas on the opposite sides thereof, the adhesive areas being staggered on said opposite sides whereby the unit can be rolled up or a number of the units can be superimposed with the facing adhesive areas out of register so that they do not adhere to each other.

2. An adhesive unit comprising a flexible strip of non-adhesive material having laterally spaced adhesive areas on the opposite sides thereof, said adhesive areas being arranged so that the unit can be rolled upon itself or a number of the units can be superimposed with the facing adhesive areas out of register so that they do not adhere to each other.

3. An adhesive unit comprising a flexible strip of non-adhesive material having a pair of laterally spaced adhesive areas, said adhesive areas being located on opposite sides of the strip and being laterally spaced, whereby the unit can be rolled upon itself or a number of the units can be superimposed with the adhesive areas out of register so that they do not adhere to each other.

4. An adhesive unit comprising a flexible strip of non-adhesive material having adhesive areas on the opposite sides thereof, adjacent adhesive areas on one side of the strip being substantially laterally spaced from each other, and at least one adhesive area on the opposite side of the strip being located between and laterally spaced from said adjacent adhesive areas, whereby the unit can be rolled upon itself or a number of units can be superimposed with the facing adhesive areas out of register and so that they do not adhere to each other.

OTTO LESSER.